US011899623B2

(12) United States Patent
Lynch et al.

(10) Patent No.: US 11,899,623 B2
(45) Date of Patent: *Feb. 13, 2024

(54) SUGGESTING CONTENT ITEMS TO BE ACCESSED BY A USER

(71) Applicant: Dropbox, Inc., San Francisco, CA (US)

(72) Inventors: Sean Lynch, San Francisco, CA (US); Ilya Fushman, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,569

(22) Filed: Mar. 31, 2022

(65) Prior Publication Data

US 2022/0222212 A1 Jul. 14, 2022

Related U.S. Application Data

(63) Continuation of application No. 16/569,833, filed on Sep. 13, 2019, now Pat. No. 11,308,032, which is a continuation of application No. 15/639,901, filed on Jun. 30, 2017, now Pat. No. 10,474,634, which is a continuation of application No. 13/777,205, filed on Feb. 26, 2013, now abandoned.

(51) Int. Cl.
*G06F 16/00* (2019.01)
*G06F 16/16* (2019.01)
*G06F 16/41* (2019.01)

(52) U.S. Cl.
CPC .......... *G06F 16/168* (2019.01); *G06F 16/41* (2019.01)

(58) Field of Classification Search
CPC ............... G06F 16/168; G06F 16/41
See application file for complete search history.

(56) References Cited

U.S. PATENT DOCUMENTS

| | | | | |
|---|---|---|---|---|
| 7,797,313 | B1* | 9/2010 | Goyal ................. | G06F 16/951 707/723 |
| 8,375,069 | B2* | 2/2013 | Aravamudan .... | G06F 16/24578 707/786 |
| 8,655,872 | B2* | 2/2014 | Kraft ................. | G06Q 10/10 707/723 |
| 8,938,474 | B2* | 1/2015 | Brooks ............... | G06F 16/328 707/783 |
| 2005/0228790 | A1* | 10/2005 | Ronnewinkel ....... | G06F 16/35 |
| 2007/0174246 | A1* | 7/2007 | Sigurdsson ......... | G06F 16/1787 |

(Continued)

OTHER PUBLICATIONS

Díaz-Sánchez D., et al., "Media Cloud: an Open Cloud Computing Middleware for Content Management," IEEE Transactions on Consumer Electronics, May 2011, vol. 57(2), pp. 970-978.

Final Office Action for U.S. Appl. No. 13/777,205 dated Feb. 13, 2015, 14 pages.

(Continued)

*Primary Examiner* — Jared M Bibbee
(74) *Attorney, Agent, or Firm* — Keller Preece PLLC

(57) ABSTRACT

A client application sends an application programming interface call to an interface of a content management system. The call specifies one or more content item search criteria. Sending the call causes the content management system to perform a lookup in a content item index to identify at least one content item that satisfies the one or more content item search criteria. Based on sending the call, the client application receives from the content management system a suggestion to attach the at least one content item to a text being displayed by at the computing system.

20 Claims, 3 Drawing Sheets

(56) References Cited

U.S. PATENT DOCUMENTS

| | | | | |
|---|---|---|---|---|
| 2009/0106202 | A1* | 4/2009 | Mizrahi | G06F 16/48 |
| | | | | 707/E17.02 |
| 2009/0248700 | A1* | 10/2009 | Amano | G06F 16/313 |
| 2009/0259627 | A1* | 10/2009 | Petrov | G06Q 30/0242 |
| 2010/0070507 | A1* | 3/2010 | Mori | G06F 16/9535 |
| | | | | 707/E17.014 |
| 2010/0241700 | A1* | 9/2010 | Rasmussen | H04L 51/043 |
| | | | | 709/203 |
| 2010/0241947 | A1* | 9/2010 | Dahn | G06F 16/332 |
| | | | | 707/769 |
| 2010/0332401 | A1 | 12/2010 | Prahlad et al. | |
| 2011/0078726 | A1* | 3/2011 | Rosenberg | H04N 21/23424 |
| | | | | 725/32 |
| 2011/0083167 | A1 | 4/2011 | Carpenter et al. | |
| 2011/0179108 | A1* | 7/2011 | Sorenson | G06F 16/9535 |
| | | | | 711/E12.017 |
| 2011/0208710 | A1 | 8/2011 | Lesavich et al. | |
| 2011/0252018 | A1 | 10/2011 | Bhose et al. | |
| 2011/0307791 | A1* | 12/2011 | Pierre | G06Q 10/10 |
| | | | | 707/754 |
| 2012/0059849 | A1* | 3/2012 | Yehaskel | G06F 16/38 |
| | | | | 715/764 |
| 2012/0203733 | A1* | 8/2012 | Zhang | G06Q 50/01 |
| | | | | 707/E17.108 |
| 2012/0291020 | A1* | 11/2012 | Scharer, III, III | H04N 5/272 |
| | | | | 717/172 |
| 2013/0097115 | A1* | 4/2013 | Savage | G06F 16/285 |
| | | | | 707/610 |
| 2013/0246938 | A1* | 9/2013 | Stata | H04L 51/42 |
| | | | | 715/752 |
| 2013/0325869 | A1* | 12/2013 | Reiley | G06F 16/437 |
| | | | | 707/741 |
| 2014/0207787 | A1* | 7/2014 | Vohra | G06F 16/90 |
| | | | | 707/741 |
| 2014/0222560 | A1* | 8/2014 | Kota | G06Q 30/0255 |
| | | | | 705/14.53 |

OTHER PUBLICATIONS

Final Office Action for U.S. Appl. No. 13/777,205 dated Jan. 12, 2017, 16 pages.
Final Office Action for U.S. Appl. No. 13/777,205 dated Jan. 14, 2016, 17 pages.
Final Office Action from U.S. Appl. No. 16/569,833, dated Oct. 14, 2021, 7 pages.
Non-Final Office Action from U.S. Appl. No. 16/569,833, dated Apr. 8, 2021, 11 pages.
Non-Final Office Action from U.S. Appl. No. 16/569,833, dated Jun. 11, 2021, 5 pages.
Notice of Allowance from U.S. Appl. No. 15/639,901, dated Oct. 9, 2019, 2 pages.
Notice of Allowance from U.S. Appl. No. 16/569,833, dated Dec. 22, 2021, 7 pages.
Notice of Allowance from U.S. Appl. No. 16/569,833, dated May 6, 2021, 7 pages.
Notice Of Allowance for U.S. Appl. No. 15/639,901 dated Aug. 5, 2019, 10 pages.
Office Action for U.S. Appl. No. 13/777,205 dated Jul. 6, 2015, 16 pages.
Office Action for U.S. Appl. No. 13/777,205 dated Jun. 30, 2016, 17 pages.
Office Action for U.S. Appl. No. 13/777,205 dated Sep. 11, 2014, 10 pages.
Ou J., et al., "The Personalized Index Service System in Digital Library," IEEE, , Digital Technology Laboratory, Institute of Computing Technology, Chinese Academy of Sciences, 2001, pp. 92-99.
Stecher R., et al., "Social Recommendations of Content and Metadata," Nov. 24, 2008, ACM, pp. 92-97.
Non-Final Office Action from U.S. Appl. No. 17/557,562, dated Nov. 23, 2022, 13 pages.
Final Office Action from U.S. Appl. No. 17/657,562, dated Apr. 5, 2023, 15 pages.
Non-Final Office Action from U.S. Appl. No. 17/657,562, dated Jul. 20, 2023, 11 pages.
Notice of Allowance from U.S. Appl. No. 17/657,562, dated Oct. 13, 2023, 8 pages.

\* cited by examiner

SUGGESTING CONTENT ITEMS TO BE ACCESSED BY A USER

PRIORITY CLAIM

This application is a continuation of U.S. patent application Ser. No. 16/569,833, filed on Sep. 13, 2019, which is a continuation of U.S. patent application Ser. No. 15/639,901, filed on Jun. 30, 2017 which issued as U.S. Pat. No. 10,474,634, which is a continuation of U.S. patent application Ser. No. 13/777,205, filed on Feb. 26, 2013. Each of the aforementioned applications is hereby incorporated by reference in its entirety.

TECHNICAL FIELD

The disclosed embodiments generally relate to online content management systems. More specifically, the disclosed embodiments relate to a search interface that facilitates searching an online content management system and possibly other storage repositories for content items associated with a user.

BACKGROUND

Users often store content items, such as files or photographs, in a synced, online content management system, such as the Dropbox™ service, which is offered by Dropbox, Inc. of San Francisco, California. In many cases, it is useful for an application that is being operated by a user to be able to access these content items. For example, an email client may be asked by a user to attach a content item to an email message. Unfortunately, no way presently exists for such an email client to obtain information about content items associated with the user. So, at present, the user must manually navigate through a file system to locate a content item to attach to an email message instead of simply being presented with a list of content items that belong to the user.

Hence, what is needed is a mechanism that allows applications to obtain information about content items that belong to a user.

DETAILED DESCRIPTION

Figure 1:
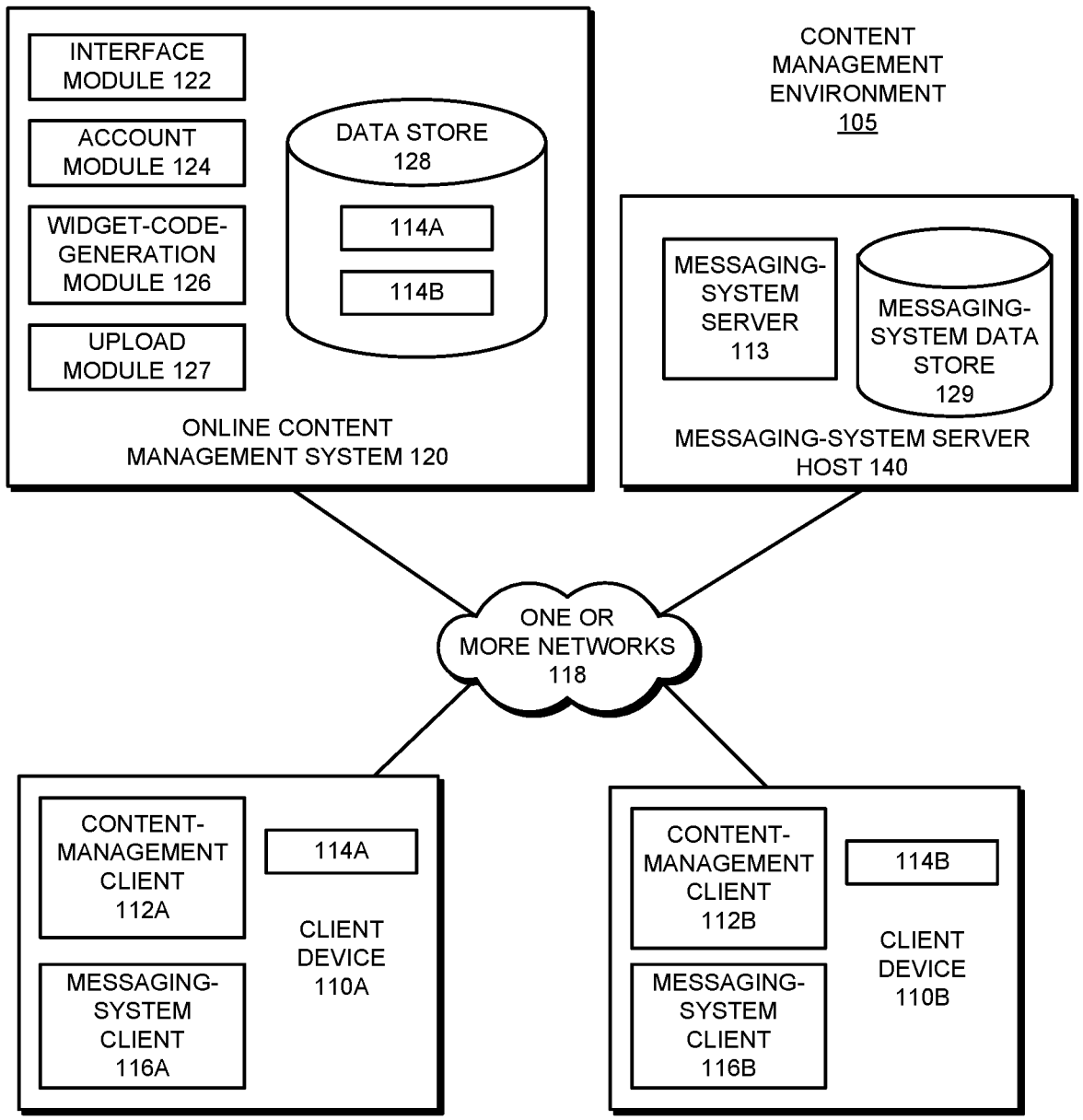
FIG. 1 shows a content management environment in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

GENERAL OVERVIEW

The disclosed embodiments provide a system that facilitates searching an online content management system for content items associated with a user. During operation, the system receives a call from a client application at a search interface in the online content management system, wherein the client application is operating on behalf of the user. In response to the call, the system performs a lookup in a per-user index within the online content management system, wherein the per-user index facilitates looking up information about content items associated with the user in the online content management system. The system then returns the information obtained during the lookup to the client application. The client application can then use the retrieved information to facilitate an interaction between the client application and the user.

Content Management Computing Environment

FIG. 1 shows content management environment 105 according to various embodiments. The exemplary embodiment of content management environment 105 shown in FIG. 1 includes a messaging-system server 113 and associated messaging-system clients 116A-116B for sending content items as message attachments. Note that the messaging system comprising messaging-system server 113 and messaging system clients 116A-116B can include an email system, a text-messaging system or an instant-messaging system, or more generally any type of system that facilitates sending electronic messages between users. As may be understood from FIG. 1, content management environment 105 includes a plurality of client devices 110A and 110B (collectively 110), a messaging-system server 113 (which resides on a messaging-system server host 140 and is associated with an messaging-system data store 129) and an online content management system 120 (also referred to as a "content management system"), which are all interconnected by one or more networks 118. Various aspects of the client devices 110, messaging-system server 113 and content management system 120 are discussed below.

In various embodiments, each client device 110 may selectively execute a content-management client application 112A and 112B (collectively 112) (also referred to as a "content-management client"), which may be used to manage content items (such as files) stored within a content management system 120. Note that, in some embodiments, synchronized copies of content items 114A and 114B may be kept on both content management system 120 and each respective client device 110. In some embodiments, client devices 110 may provide a file-browser type interface (not shown) for directly manipulating the content items stored on content management system 120 without maintaining a local copy. Client devices 110 may also include messaging-system clients 116A and 116B (collectively 116) for receiving and sending messages associated with messaging-system server 113. Note that these messaging-system clients 116A and 116B can be web-based or native-client-based messaging-system clients.

While only two client devices 110A and 110B are shown in FIG. 1 for purposes of clarity, it should be understood by those skilled in the relevant field that many client devices 110A and 110B may simultaneously connect through network(s) 118 to messaging-system server 113 and content management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within content management system 120, and the content items may be stored in any suitable format. When content-management client 112 presents content items that are stored within the file storage system to a user, the content items may be arranged in folders and the folders themselves may be arranged in other folders, or in any other arbitrary arrangement supported by content management system 120, as determined by the user. However, one of skill in the art should understand in light of this disclosure that each user's file storage architecture may be considerably different from the next, and in some instances, the file storage architecture may be implemented to maximize storage and file retrieval efficiency.

Content management system 120 stores content items and manages access to those content items via client devices 110. Content management system 120 and its components may be implemented using any appropriate hardware and software for content item serving, storage, and retrieval functions. For example, content management system 120 may be implemented in the form of a single server or multiple servers.

In various embodiments, content management system 120 includes interface module 122, account module 124, widget-code-generation module 126, upload module 127, and data store 128. Some of these elements of content management system 120 are discussed below.

In particular embodiments, interface module 122 may facilitate content item access and content item storage between content management system 120 and client devices 110. Interface module 122 may receive content items from and send content items to client devices 110 consistent with the user's preferences for sharing content items. Interface module 122 may act as the counterpart to a client-side file-explorer style user interface that allows a user to manipulate content items directly stored on content management system 120. In some embodiments, software operating on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via a suitable messaging-system client 116) and allow a user to manipulate content items stored within content management system 120. In this way, the user can directly manipulate content items stored within content management system 120.

In various embodiments, data store 128 may store content items such as those uploaded using client devices 110, or using any other suitable computing device. In the embodiment illustrated in FIG. 1, client device 110A that is associated with a first user, is shown as locally storing at least one content item 114A, and client device 110B that is associated with a second user, is shown as locally storing at least one content item 114B. As shown in FIG. 1, copies of the locally stored content items are maintained in data store 128 of content management system 120.

In various embodiments, data store 128 may maintain information identifying the user, information describing the user's file directory, and other information in a file journal that is maintained for each user. In some embodiments, the file journal may be maintained on content management system 120, and in other embodiments, a file journal (e.g., a "server-side file journal") may be maintained on both content management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114A stored within content management system 120. Similarly, any changes that are made to content item 114A on content management system 120 may also be automatically reflected in the copy of content item 114A stored on client device 110A.

In particular embodiments, account module 124 may track content items stored in data store 128 and entries in the server-side file journal for each content item. As users grant file access permissions to other users, account module 124 may update the server-side file journal associated with each relevant user in data store 128. Account module 124 may also track client devices 110 that are associated with each user's account. For example, a user may want to share all their content items between their desktop computer, tablet computer, and mobile device. To make such a sharing arrangement seamless to the user, the user's single account on content management system 120 may be associated with each of the user's respective client devices. In some embodiments, an application running on each respective client device 110 may help to coordinate synchronization of content items on the client device with corresponding versions of the content items within the user's account in content management system 120, and also with corresponding versions of the content items stored on the user's various other client devices.

In particular embodiments, widget-code-generation module 126 may be configured to generate code that may be used to create an message-attachment widget on a remote messaging-system client. In particular embodiments, this code may be HTML code that may be pasted into a messaging-system client to create the message-attachment widget. In other embodiments, the code may be program code that is integrated into a native-client-based messaging system. In particular embodiments, the message-attachment widget may include: (1) a button that may be used to select one or more attachments from a user's messaging-system client; and (2) code to facilitate the upload of the selected attachments directly from the messaging-system client to content management system 120. Also, in particular embodiments, the message-attachment widget may include: (1) a button that may be used to activate a file-selection interface to select a content item to be attached to a message; and (2) code to facilitate including a link to the selected content item in the message.

Search Interface

Figure 2:
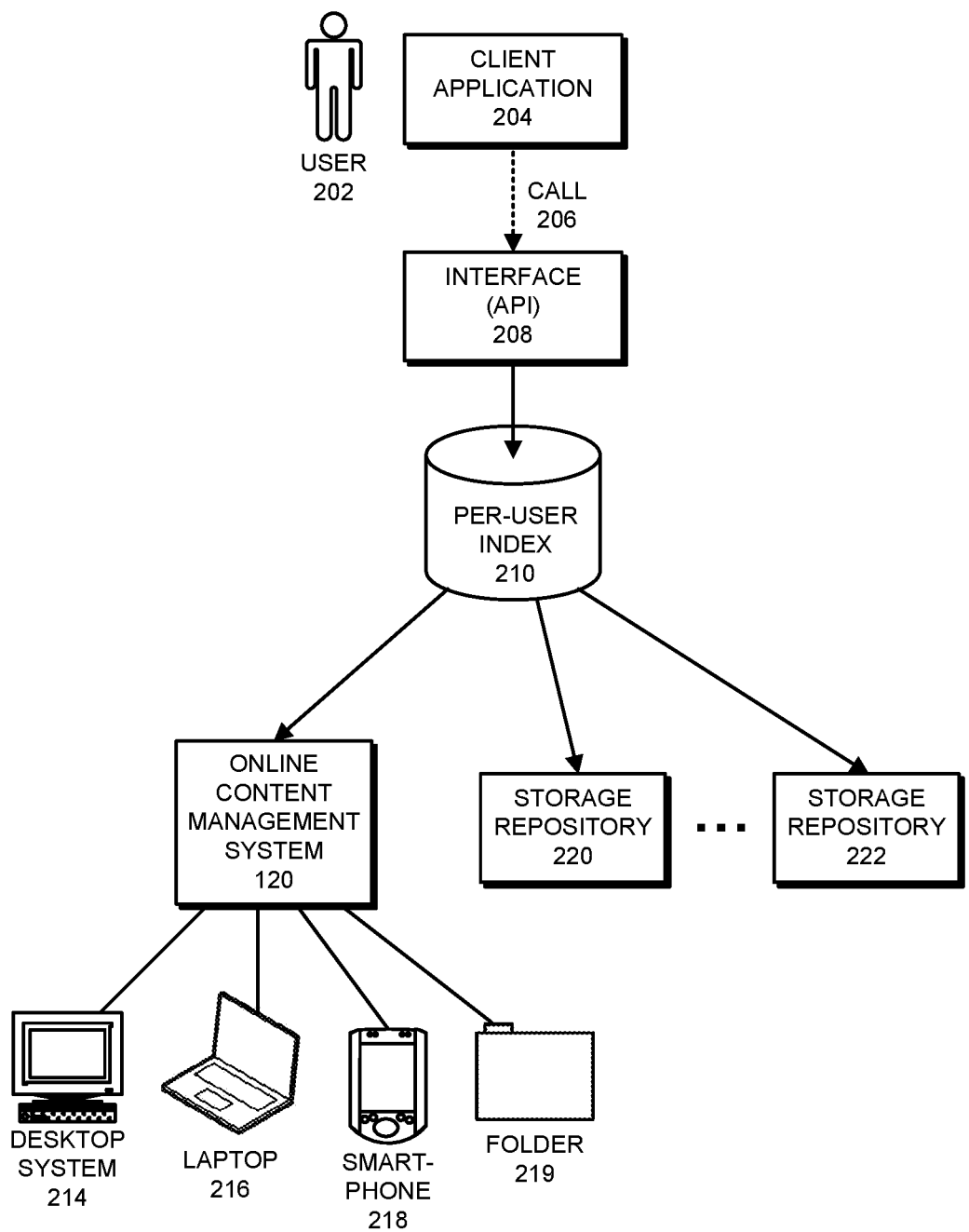
FIG. 2 shows how a per-user index that is accessed through an API can be used to obtain information about content items associated with a user in accordance with the disclosed embodiments.

FIG. 2 shows how a per-user index 210 that is accessed through an application-programming interface (API) 208 can be used to obtain information about content items associated with a user in accordance with the disclosed embodiments. As is illustrated in FIG. 2, a user 202 interacts with a client application 204. During this process, client application 204 makes a call 206 to an interface 208, which is exposed by the online content management system 120. For example, the interface 208 can include an API that provides a search function. A call to this search function can include a number of parameters, such as a user identifier, or one or more keywords and associated logical operators. The parameters can also specify a ranking function to determine an ordering for the search results, as well as a result limit that limits the number of search results that are displayed. The API can also provide functionality that enables the online content management system to authenticate the client application 204 as operating on behalf of the user. This functionality can be in the form of a special API call that client application 204 makes to authenticate itself with online content management system 120, or the authentication functionality can be integrated into the search function itself.

Upon receiving the call 206, and after client application 204 is optionally authenticated, interface 208 queries the per-user index 210 on behalf of client application 204. Note that per-user index 210 is structured to look up content items, such as files, photos and video clips on behalf of user 202. Hence, per-user index 210 can include a collection of indices, wherein each index references content items associated with a different user, and wherein a "user identifier" can be used to select a specific index (or a set of indices) associated with each user. Moreover, each index may facilitate looking up a keyword (or a logical combination of keywords) in entries for content items associated with a user.

In some embodiments, each index contains metadata about content items associated with each user. For a given content item, this metadata can include: (1) a name for the content item, such as a file name, (2) a creation date for the content item, (3) an identifier for an owner of the content item, (4) a last modification date for the content item, (5) a modification history for the content item, (6) a size of the content item, (7) a file type for the content item, (8) a pointer (or index) to the content item, which can be used to retrieve the content item, (9) a file system permission for the content item, such as "read-write" or "read-only", (10) keywords to facilitate searches for the content item, (11) a list of users associated with the content item, (12) an expiration date for the content item, (13) security related information for the content item, such as a password or an encryption key that is required to access the content item (this security-related information can be stored in encrypted form), and (14) statistics on how frequently the content item has been accessed (for example, if the content item is a video, how often the video has been played). In other embodiments, per-user index 210 can index the data within each content item to facilitate looking up content items containing specific words.

In some embodiments, each per-user index covers a user's content items that are stored in online content management system 120. This includes content items that are stored in an online server in online content management system 120, as well as replicated copies of content items stored on various computing devices that belong to the user, such as a desktop system 214, a laptop system 216, and a smartphone 218, and a shared folder 219 that is shared with one or more other users.

Client application 204 can also make calls to other functions in interface 208 to manage content items associated with per-user index 210. For example, client application 204 can call a function in interface 208 to add a content item to per-user index 210. The parameters of this call can include metadata for the content item as well as a pointer (e.g., a URL) to the content item. Note that client application 204 can automatically add content items to per-user index 210 whenever the user accesses a new content item. Client application 204 can also make a call through interface 208 to modify an entry for a given content item whenever the user modifies the content item. For example, if the content item is a document and the user adds text to the document, client application 204 can modify the metadata for the document that is stored in per-user index 210 to indicate that the size of the document has increased. Client application 204 can also make a call through interface 208 to delete a content item from the per-user index. For example, client application 204 can automatically delete a content item from per-user index if the user does not access the content item for a predetermined period of time, say 3 months.

As illustrated in FIG. 2, each per-user index also covers "external content items" stored in external storage repositories 220-222 associated with the user that are located outside of online content management system 120. For example, these external storage repositories 220-222 can include one or more hard drives belonging to the user and/or directories associated with the user located on one or more external file servers. In one scenario, an application associated with the user (such as client application 204) can automatically make a call through to interface 208 to add an entry for an external content item to the per-user index 210 when the user accesses the external content items.

Per-user index 210 can also cover shared content items. For example, as mentioned above, per-user index 210 can cover one or more shared folders that are shared among users who are members of a team of collaborating users. Per-user index 210 may also contain a "shared index" that is shared among a team of collaborating users. This shared index can be used to access shared content items that belong to the team of collaborating users, even though the content items may or may not be located in the same shared directory. In this case, online content management system 120 can include a mechanism for granting access to individual members of the team to allow them to access the shared content items.

For a given user, per-user index 210 may also contain a "personal index" for personal content items, such as photographs, and a separate "business-related index" for business-related content items, such as work-related documents.

In some embodiments per-user index 210 is implemented as a relational database table for a given user, wherein the table includes a row for each content item that belongs to the user and a column for each metadata attribute. A separate index can be created for each column in the relational table to facilitate rapidly searching for specific attributes in the column. In some embodiments, per-user index 210 comprises a set of hash tables, wherein each hash table is configured to facilitate rapid lookups for a different metadata attribute for the content items associated with the user.

Example Process

Figure 3:
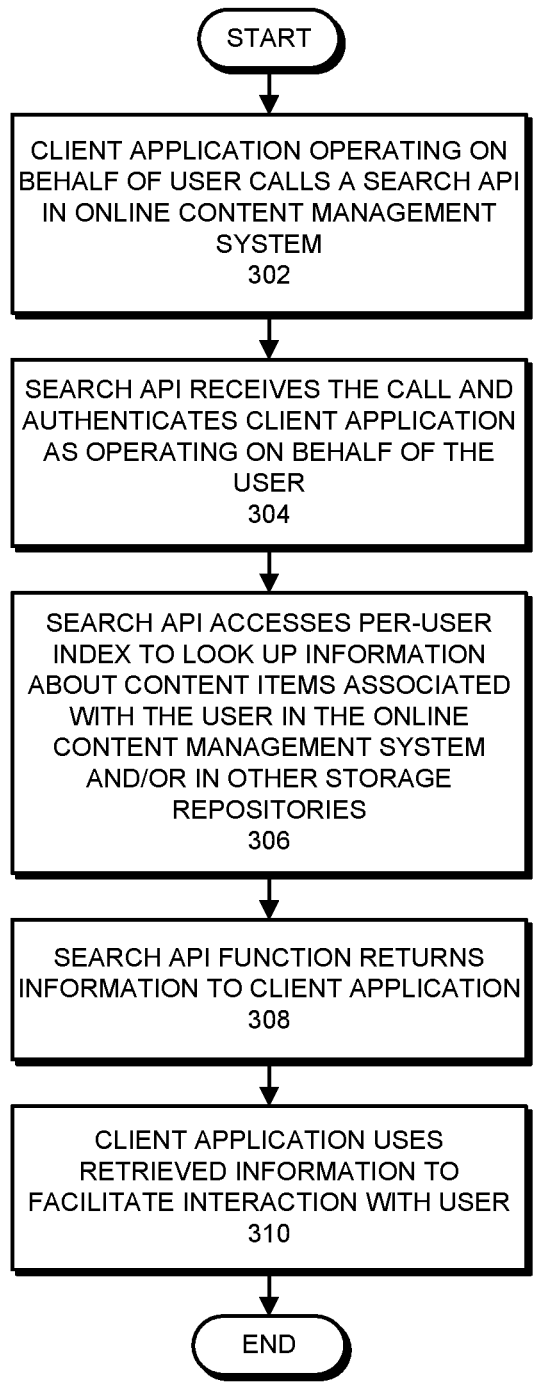
FIG. 3 presents a flow chart illustrating the process of using the per-user index to obtain information about content items associated with a user in accordance with the disclosed embodiments.

FIG. 3 presents a flow chart illustrating the process of using a per-user index 210 to obtain information about content items that belong to a user 202 in accordance with the disclosed embodiments. First, a client application 204, such as an email client or a browser that is operating on behalf of user 202, makes a call 206 to search API 208 in online content management system 120 (step 302). For example, client application 204 can call a search function in the search API 208 providing an identifier for user 202 as a parameter.

Next, search API 208 at the online content management system 120 receives the call 206 and authenticates client application 204 as operating on behalf of user 202 (step 304). This authentication process can involve first receiving credentials for user 202 from client application 204, wherein the credentials can include a username and password, a digital certificate, or a live session token. Next, the authentication process involves verifying that the credentials are valid.

Once client application 204 has been authenticated, search API 208 accesses per-user index 210 to look up information about content items associated with user 202 that are located in the online content management system 120 and/or in other storage repositories 220-222 related to user 202 (step 306). The information obtained from per-user index 210 can include a full or partial list of content items associated with user 202 in online content management system 120. More specifically, call 206 through search API 208 can include: a user identifier, search criteria, a ranking function for the search results, and a limit for the number of search results returned. For example, the search criteria can indicate that the search is targeted to music files, the ranking function can be based on the number times each music file has been accessed by the user, and the number of search results returned can be limited to 25. This call causes online content management system 120 to access per-user index 210 to lookup at all music files associated with the user. The returned results are then sorted by the number of times each music file has been accessed by the user. Finally, the top 25 most-accessed files are returned to client application 204. Client application 204 can then use these results to suggest music files for the user to play.

Next, search API 208 returns the information about the content items to client application 204 (step 308). Client application 204 then uses the information to facilitate an interaction with user 202 (step 310). In general, the returned information includes content items that belong to the user and that satisfy the specified search criteria. Moreover, the returned content items can be ranked based on a ranking function that specifies a ranking criterion for the search results. Client application 204 can use the returned list of content items to make suggestions for content items to be accessed by the user. In one case, an email application can suggest content items to attach to an email message. For example, if a user types "here is the latest version of the Sales Brochure" into an email message, the email client can use this information to search through the user's content items to suggest that the user attach a file labeled "SalesBrochure.doc" to the email message. In another example, if the user activates a button to include an attachment to the email message, the email application can pop up a window listing the most recently edited files as suggestions for an attachment.

In another case, a browser serves up targeted advertisements to the user based on attributes of the user's content items. For example, if a user is operating a web browser and the user stores a PDF printout of an airline ticket to Hawaii in a folder within content management system 120, the browser can use the search API to find the airline ticket to Hawaii and can run a targeted advertisement for a hotel in Hawaii inside the browser. Note that content items which are stored within content management system 120 by a user can be automatically indexed to appear in per-user index 210.

Also note that the gathering and use of data from various sources may improve the quality of targeted advertising. In some instances, the data may include personal information, which could enable more controlled and/or limited delivery of advertising content. Nonetheless, any collection, analysis, disclosure, transfer, storage, or other use of such personal information should comply with or exceed the best known privacy and security policies and practices. For example, personal information is preferably only collected for legitimate and reasonable uses and should not shared or sold outside of those legitimate uses. In addition, users may be able to selectively block the use of, or access to, personal information, through hardware and/or software elements.

Moreover, although the present disclosure contemplates the use of personal information to implement various embodiments, some embodiments can be implemented without the need for accessing such personal information. For example, content can be selected and delivered to users by inferring preferences based on non-personal information data or a bare minimum amount of personal information.

In another example, while a user is sending a text message to a friend, the user might activate a user interface element within the text-messaging application to add a picture to the text message. In this example, the text-messaging application can use the per-user index 210 to search for pictures which include the friend, and can present these pictures as suggestions to include in the text message. More specifically, the search through per-user index 210 can look for pictures which are tagged with an identifier for the friend, and the text-messaging application can present thumbnails of these pictures as possible attachments to the text message.

In another example, a document-editing application can perform a search using per-user index 210 to suggest documents to edit. This search can look for documents associated with the user, and can return a list of such documents which are ranked based on how frequently each document has been edited within the last week by the user. The document-editing application can then present this list to the user as possible documents to edit.

In yet another example, online content-management system 120 can use per-user index 210 to make suggestions on how to reorganize documents within online content management system 120. For example, online content management system 120 can use per-user index 210 to perform a search through the user's content items to identify content items which have been accessed by multiple users. Online content management system 120 can then suggest that these content items be moved to a shared folder or a shared directory within online content management system 120. In another case, online content management system 120 can perform a search using per-user index 210 to identify content items which have not been accessed for more than one year, and can suggest that the user move these content items from online content management system 120 to some type of archival storage.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

The invention claimed is:

1. A computing system comprising:
   at least one processor; and
   at least one non-transitory computer-readable storage medium storing instructions that, when executed by the at least one processor, cause the computing system to:
   receive, from an application associated with a first system that is separate from a content management system, an application programming interface (API) call generated during user activity within the application, the user activity comprising a user input to be used within the first system, the API call specifying content item search criteria generated based on the user input to be used within the first system;
   based on the content item search criteria specified in the API call, perform a lookup in a user-specific content item index within the content management system associated with a user account to identify at least one content item that satisfies the content item search criteria generated based on the user activity, wherein the user-specific content item index references content items associated with the user account; and
   provide, to the application, a suggestion to access the at least one content item from the content management system using the application associated with the first system.

2. The computing system of claim 1, wherein the application is a client application installed on a client device.

3. The computing system of claim 1, wherein the application comprises at least one of a web browser, an email application, an electronic messaging application, a text application, or a document editing application.

4. The computing system of claim 1, wherein the user activity within the application comprises text composition within the application.

5. The computing system of claim 1, wherein the user activity within the application comprises saving one or more content items to the content management system.

6. The computing system of claim 1, further comprising instructions that, when executed by the at least one processor, cause the computing system to:
   identify a plurality of content items that satisfy the content item search criteria, the plurality of content items comprising the at least one content item; and
   wherein providing the suggestion to access the at least one content item comprises providing a list of the plurality of content items.

7. The computing system of claim 1, wherein the user-specific content item index comprises one or more shared folders that are shared among a group of collaborating users.

8. A computer-implemented method comprising:
   receiving, from an application associated with a first system that is separate from a content management system, an application programming interface (API) call generated during user activity within the application, the user activity comprising a user input to be used within the first system, the API call specifying content item search criteria generated based on the user input to be used within the first system;
   based on the content item search criteria specified in the API call, performing a lookup in a user-specific content item index within the content management system associated with a user account to identify at least one content item that satisfies the content item search criteria generated based on the user activity, wherein the user-specific content item index references content items associated with the user account; and
   providing, to the application, a suggestion to access the at least one content item from the content management system using the application associated with the first system.

9. The computer-implemented method of claim 8, wherein the application is a client application installed on a client device.

10. The computer-implemented method of claim 8, wherein the application comprises at least one of a web browser, an email application, an electronic messaging application, a text application, or a document editing application.

11. The computer-implemented method of claim 8, wherein the user activity within the application comprises actions with respect to content items associated with the user account.

12. The computer-implemented method of claim 8, wherein the user-specific content item index comprises one or more shared folders that are shared among a group of collaborating users.

13. The computer-implemented method of claim 8, wherein:
   based on the user activity within the application, the content item search criteria comprise a user tag; and
   the at least one content item is associated with the user tag.

14. The computer-implemented method of claim 8, further comprising:
   identifying a plurality of content items that satisfy the content item search criteria, the plurality of content items comprising the at least one content item; and
   wherein providing the suggestion to access the at least one content item comprises providing a list of the plurality of content items for display within a graphical user interface corresponding to the application.

15. The computer-implemented method of claim 8, wherein providing the suggestion to access the at least one content item comprises providing an option to attach the at least one content item to a message being composed within the application.

16. A non-transitory computer-readable medium storing instructions thereon that, when executed by at least one processor, cause a computing device to:

receive, from an application associated with a first system that is separate from a content management system, an application programming interface (API) call generated during user activity within the application, the user activity comprising a user input to be used within the first system, the API call specifying content item search criteria generated based on the user input to be used within the first system;

based on the content item search criteria specified in the API call, perform a lookup in a user-specific content item index within the content management system associated with a user account to identify at least one content item that satisfies the content item search criteria generated based on the user activity, wherein the user-specific content item index references content items associated with the user account; and provide, to the application, a suggestion to access the at least one content item from the content management system using the application associated with the first system.

17. The non-transitory computer-readable medium of claim 16, wherein the application is a client application installed on a client device.

18. The non-transitory computer-readable medium of claim 16, wherein the user activity within the application comprises actions with respect to content items associated with the user account.

19. The non-transitory computer-readable medium of claim 18, wherein:

based on the user activity within the application, the content item search criteria comprise a user tag; and the at least one content item is associated with the user tag.

20. The non-transitory computer-readable medium of claim 16, further comprising instructions that, when executed by the at least one processor, cause the computing device to:

identify a plurality of content items that satisfy the content item search criteria, the plurality of content items comprising the at least one content item; and wherein providing the suggestion to access the at least one content item comprises providing a list of the plurality of content items for display within a graphical user interface corresponding to the application.

* * * * *